United States Patent [19]

Kroniger

[11] 4,181,322
[45] Jan. 1, 1980

[54] WHEEL SUSPENSION ARRANGEMENT FOR MOTOR VEHICLES

[75] Inventor: Wilhelm Kroniger, Müncheingen-Kallenberg, Fed. Rep. of Germany

[73] Assignee: Firma Dr. Ing. h.c.F. Porsche AG, Fed. Rep. of Germany

[21] Appl. No.: 795,802

[22] Filed: May 11, 1977

[30] Foreign Application Priority Data

Oct. 7, 1976 [DE] Fed. Rep. of Germany ....... 2645272

[51] Int. Cl.² .............................................. B60G 11/08
[52] U.S. Cl. ................................. 280/699; 267/19 A; 280/720; 308/238
[58] Field of Search ............... 280/694, 690, 699, 661, 280/669, 673, 674, 675, 718, 720; 308/238, 26; 267/57, 19 R, 15 A, 30

[56] References Cited

U.S. PATENT DOCUMENTS

| 2,115,915 | 5/1938 | McCain | 280/694 |
| 3,229,783 | 1/1966 | Müller | 280/690 |
| 3,942,816 | 3/1976 | Schrenberg | 280/673 |

Primary Examiner—Joseph F. Peters, Jr.
Assistant Examiner—John A. Carroll
Attorney, Agent, or Firm—Craig & Antonelli

[57] ABSTRACT

A wheel suspension arrangement is provided for supporting and guiding a rear wheel and wheel carrier of a motor vehicle. More specifically, a lower wheel guide linkage is provided which includes a rear guide rod arm formed as a leaf spring which extends transversely of the vehicle from the wheel carrier to a pivot bearing support at the vehicle body. A front guide rod arm assembly is also provided which includes a longitudinal strut member extending from the wheel carrier forwardly. The forward end of the longitudinal strut member is elastically supported on a bearing rotating shaft by way of an elastic bushing interposed between a sleeve of the longitudinal strut member and the rotating bearing shaft. The rotating bearing shaft is in turn connected to the vehicle body by way of a bearing, which also permits limited movement thereof about a vertical axis. In order to accommodate relative angular movement of the longitudinal strut member and the rotating bearing shaft, a vertically extending pivot pin interconnects these members. In order to lend different elastic yieldingness to the hinged connection between the longitudinal strut member and the bearing rotating shaft, portions of the elastic material of the elastic bushing are cutaway at the horizontal sides.

12 Claims, 3 Drawing Figures

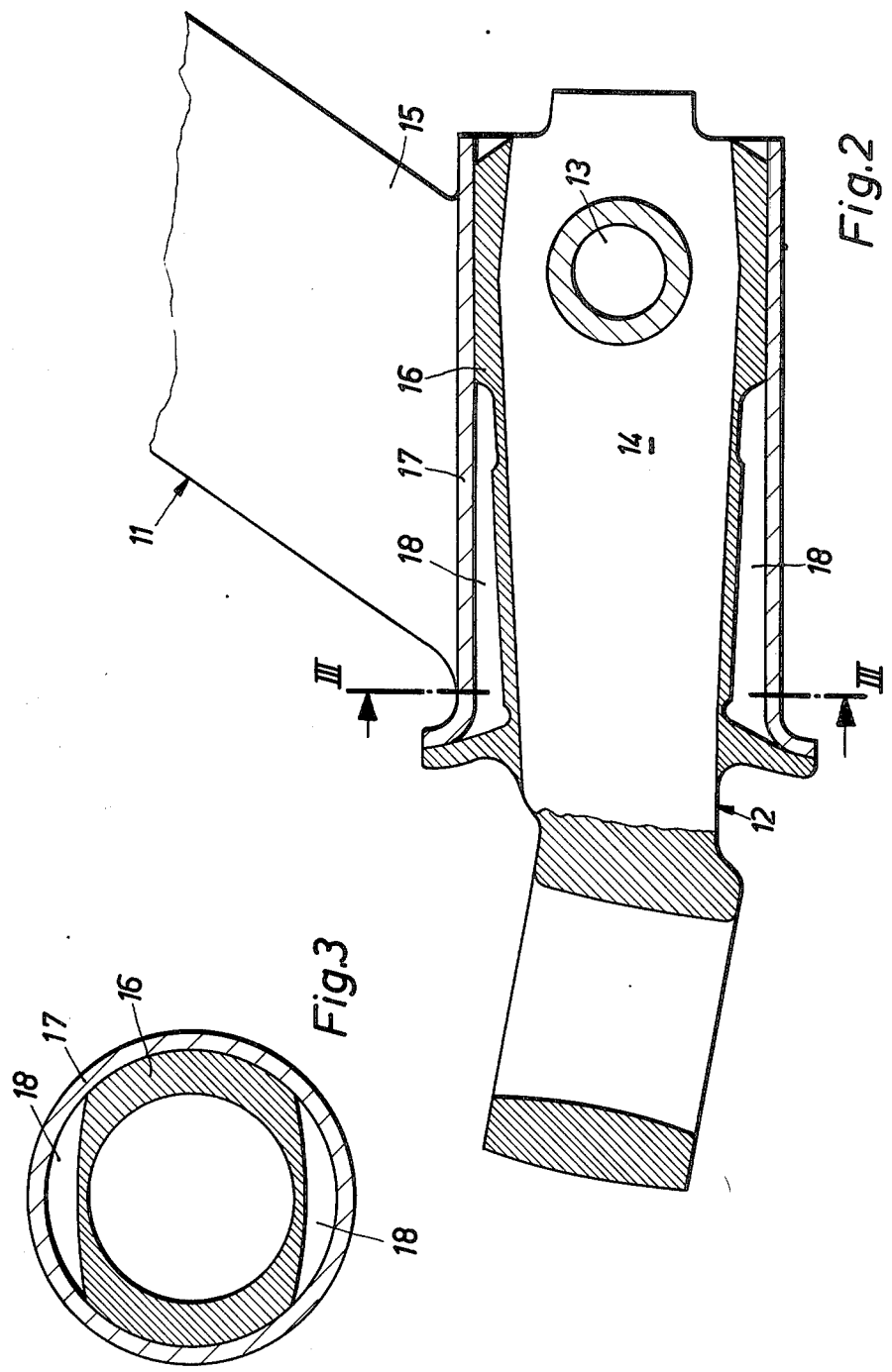

WHEEL SUSPENSION ARRANGEMENT FOR MOTOR VEHICLES

BACKGROUND AND SUMMARY OF THE INVENTION

The present invention relates to a wheel suspension arrangement for motor vehicles of the type having a wheel guide linkage arranged swingably at the vehicle body and the wheel carrier and being yieldingly supported in the vehicle longitudinal direction.

With such wheel suspensions, shifting movements occur at the wheel guide members supported at the vehicle body in elastic support points as a result of changes in loading caused during braking, acceleration, and deceleration of the vehicle. These movements often result in unfavorable wheel position changes with adverse effects on the advance tracking characteristics (camber condition with top wheel portions inclined inwardly toward the vehicle middle—"Vorspur").

The present invention contemplates a wheel suspension arrangement which avoids the above-mentioned disadvantages and which is simple in construction while decreasing unfavorable tracking characteristics during straight driving as well as indenting effects on the wheels.

According to preferred embodiments of the invention, the wheel guide arrangement includes a guide rod arm linkage having a rear guide rod arm formed of a bending-elastic element and extending from a rear pivot bearing at the vehicle body to the wheel carrier, along with a front guide rod arm assembly composed of first and second front guide rod members hingedly connected to one another and being rotatable or pivotable about an essentially vertical swinging axis or axle. In particularly preferred embodiments, the front guide rod arm assembly includes a longitudinal strut member extending from the wheel carrier in the forward vehicle driving direction and a bearing rotating shaft flexibly hingedly connected with the longitudinal strut member at one end thereof and bearingly supported at the vehicle body at the other end thereof. The bearing rotating shaft is connected to the longitudinal strut member by means of a pin which forms the vertical swinging or pivoting axle. With this arrangement and construction, loading changes tending to change wheel characteristics are compensated for in a simple manner. In addition, noises are reduced which are normally caused in existing wheel suspension systems due to stops arranged at the guide rod bearings at the side of the vehicle body and the like.

Further, according to a preferred illustrated embodiment of the invention, the bearing rotating shaft is supported in a sleeve of the longitudinal strut member under the interposition of an elastic bushing of variable yieldingness or elasticity about its periphery. The bearing rotating shaft extends on an angle from the vehicle center line outwardly in the direction opposite the direction of driving and is disposed to be at an obtuse angle to the mean center line of the longitudinal strut member. By this configuration, the portions of the front guide rod arm assembly pivot towards the vehicle center in the direction opposite to the direction of driving. Furthermore, the longitudinal strut member by way of the yielding connection with the bearing rotating shaft, not only improves steering functions in response to wheel position changes experienced in driving, it also provides for a noise insulating effect.

To further enhance the wheel support steering characteristics, it is further provided according to the invention that the elastic bushing is constructed more yielding in the horizontal direction of loading than in the vertical direction of loading. To accomplish this difference in yielding characteristics, the elastic bushing is preferably provided with recesses at the horizontal sides thereof. These recesses extend over about one-half the length of the elastic bushing, which elastic bushing extends over the length of the sleeve of the longitudinal strut member. Further, it is provided according to the preferred illustrated embodiment of the invention, that the vertical axis of rotation for the longitudinal strut member and the bearing rotating shaft with respect to one another, is arranged between the bearing rotating shaft and the longitudinal strut member at the inside of the bearing rotating shaft in the area behind the recesses of the elastic bushing. With this last-mentioned construction, the yielding characteristics of the elastic bushing are optimally combined with the pivotal connection of the longitudinal strut member and bearing rotating shaft by way of the vertical pin. That is, the recesses are disposed so as to accommodate the larger relative movement of the longitudinal strut member and bearing rotating the shaft at positions spaced from the vertical pin axle.

A further advantage of the wheel suspension construction according to the present invention is that expensive bearings at the side of the body of the wheel guide members with variable elasticities, as well as stops for the compensation of wheel position changes during circumferential forces, can be dispensed with.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 2 is a horizontal sectional view through a bearing rotating shaft of the wheel guide linkage which shows detailed I of FIG. 1 in an enlarged form; and FIG. 3 is a cross-sectional view along line III—III of FIG. 2.

DETAILED DESCRIPTION OF THE DRAWINGS

Figure 1:
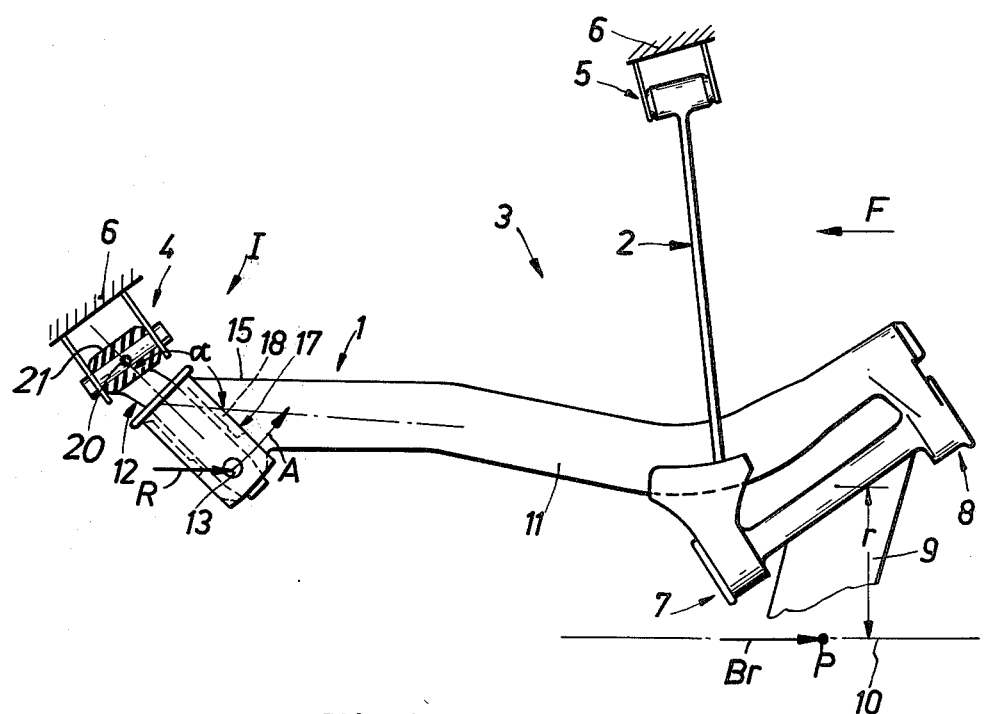
FIG. 1 is a top schematic view of a lower wheel guide linkage of a wheel suspension arrangement constructed in accordance with a preferred embodiment of the present invention.

The rear axle of a vehicle comprises a wheel guide linkage 3 consisting of a guide rod arm assembly 1 (longitudinal strut assembly) and a guide rod arm 2 (transverse strut). The wheel guide linkage 3 is hinged to the vehicle body 6 under interposition of bearings 4 and 5 and at the wheel support or carrier 9 under interposition of bearings 7 and 8. In the drawing (FIG. 1) only the wheel center line 10 of the wheel is shown. It will also be understood that FIG. 1 only depicts one side of the vehicle center line, the other side thereof being equipped with a similar wheel and wheel suspension arrangement on an actual vehicle. It should also be understood that the illustrated assembly only includes the lower portion of the wheel guide linkage 3, with an unillustrated upper wheel guide linkage also provided connecting the wheel carrier 9 with the vehicle body in a guiding support manner. The upper part of the wheel guide linkage (not shown) engages the wheel carrier and may consist of a stiff transfer strut or the like supported at the vehicle body. The wheel guide linkage 3 is additionally held over a spring leg (not shown) which supports itself with its upper end at an abutment of the vehicle body.

The longitudinal strut assembly 1 is provided with a hinge-part which is composed of a longitudinal strut member 11 held at the side of the wheel support 9 and a bearing rotating shaft or rocker arm 12 supported at the side of the body. The longitudinal strut assembly 1 is rotatable or pivotal at least about an essentially vertical axis of rotation 13, and/or 19, as will be explained more fully below.

The transverse strut 2 of the wheel guide linkage 3 consists of a bending-elastic element, preferably leaf spring, which supports itself in bearing 5 of the body 6.

The bearing rotating shaft 12 is jointedly connected with the longitudinal strut member 11 by means of a pin forming the axle or axis of rotation 13, one of the vertical axes of rotation for the assembly 1. The free end 15 of the longitudinal strut member 11 is supported on the bearing attachment 14 of the bearing rotating shaft 12 with the interposition of an elastic bushing 16. The elastic bushing 16 is pressed onto the bearing portion of the longitudinal strut member 11, which last-mentioned bearing portion consists of a sleeve 17 formed with the member 11. The pin 13 is fixed in the sleeve 17 as well as in the bearing attachment 14 of the rotating shaft 12 and effects a certain flexibility between bearing rotating shaft 12 and the longitudinal strut member 11, thereby permitting limited pivotal movement about the vertical axis of rotation formed by pin 13.

The bearing rotating shaft 12 extends inclined from the vehicle center line 19 oppositely to the direction of driving force F toward the outside, whereby the longitudinal strut member 11 is arranged at an obtuse angle $\alpha$ to the bearing rotating shaft 12 and extends approximately parallel to the vehicle center line 19. The mean center line of longitudinal strut member 11 is shown in dash and dot lines as an auxiliary line between the two portions are positioned at a slight angle to one another as shown in FIG. 1.

The bearing 4 at the side of the body in which the bearing rotating shaft 12 is held is provided in an axial as well as a radial loading direction with a small degree of flexibility by the inclusion of a bushing 21 of predetermined elasticity as shown in FIG. 1. By this construction, and above and beyond the swingability about the axle 13 between bearing rotating shaft 12 and the longitudinal strut member 11, a swingability of the bearing rotating shaft 12 in a horizontal direction about the imaginary vertical bearing axis 20 is permitted to a certain extent. The degree of swingability will be a function of the existing lever ratios in combination with the elasticities of the bushings.

The elastic bushing 16 is provided with recesses 18 which only extend in the horizontal direction as shown in detail in FIGS. 2 and 3. These recesses 18 extend over about half the length of bushing 16. In contrast thereto, no recesses are provided in the vertical direction or vertical sides of the elastic bushing 16. In non-illustrated other preferred embodiments, the recesses are replaced by zones of greater yieldingness, while the vertical direction zones are provided with means for forming small yieldingness.

The vertical axis of rotation through axle 13 between the bearing rotating shaft 12 and the longitudinal strut member 11 is arranged at the inside of the bearing rotating shaft 12 in the area of elastic bushing behind the recesses 18. The bushing 16 is combined with the sleeve 17 in this area over its entire circumference.

The mode of operation of the wheel suspension arrangement of the present invention is described in detail as follows. With the brake force $B_r$ occurring in the wheel standpoint or position P, it is first brought about that in the elastic wheel support bearing 7 and 8 through the given lever arm r a tendency of wheel support 9 to move towards the wheel guide linkage 3 results (wheel camber changes with bottom moving toward vehicle center 19—"Nachspur"). Through the reaction force R of the wheel guide linkage 3 engaging at the pin 13 acting in opposition to the direction of driving F, pin 13, guided by the bearing rotating shaft 12, swings about bearing 4 at the side of the body in the direction A towards the rear in opposition to the direction of driving F as well as to the inside towards the vehicle center line. At the same time a swinging about the axis 20 may also result. The wheel guide linkage 3, and, therefore, the wheel itself can adjust themselves in the direction of advance tracking (wheel camber change with top moving toward vehicle center 19—"Vorspur"). Changes in the wheel position in the opposite direction (Nachsphur), are therefore compensated by the suspension system. This effect also occurs during deceleration during removal of gas supply. The transverse strut 2, consisting of a bending elastic element, makes it possible during this process, for a horizontal transverse movement of the wheel guide linkage 3 so as to support the deflection movement of the wheel guide linkage.

By means of a corresponding turning of the yieldingness in the elastic bushing 16, any desired elasticity may be obtained, for example, for the various load-change cases, such as during braking and during acceleration, with resultant different wheel position corrections being obtained with the end effect being that wheel position can be maintained in spite of a engaging forces.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A wheel suspension arrangement for motor vehicles of the type including a wheel guide linkage arranged swingably at the vehicle body for supporting a wheel carrier in the vehicle longitudinal direction; said suspension arrangement comprising:

elastic means for enabling horizontal transverse movement of the wheel guide linkage, said elastic means including a rear guide rod formed of a flexibly bending elastic element and extending from a rear pivot bearing at the vehicle body to the wheel carrier, and a front guide rod arm assembly, said front guide arm assembly being formed of first and second front guide rod members hingedly connected to one another, said front guide rod arm assembly extending from said wheel carrier to a position disposed forwardly of said rear pivot bearing, and said guide rod members being pivotal about at least an essentially vertical pivot axis.

2. Wheel suspension arrangement for motor vehicles including a wheel guide linkage arranged swingably at the vehicle body for flexibly supporting a wheel carrier in the vehicle longitudinal direction; said wheel guide linkage comprising:

a rear guide rod arm formed of a bending elastic element and extending from a rear pivot bearing at the vehicle body to the wheel carrier, and a front guide rod arm assembly, said front guide arm assembly being formed of first and second front guide rod members hingedly connected to one another, said front guide rod arm assembly extending from said wheel carrier to a position disposed forwardly of said rear pivot bearing and said guide rod members being pivotal about at least an essentially vertical pivot axis, wherein said first front guide rod member is a longitudinal strut member extending from said wheel carrier in the forward vehicle driving direction, wherein said second front guide rod member is a bearing rotating shaft which is flexibly connected with said longitudinal strut member, and wherein said bearing rotating shaft is arranged between the vehicle body and the longitudinal strut member for transmitting guiding and supporting forces therebetween.

3. An arrangement according to claim 2, wherein said bearing rotating shaft is connected with the longitudinal strut member by means of a vertically extending pin, said vertical pivot axis extending through said pin.

4. An arrangement according to claim 2, wherein said bearing rotating shaft extends inclined transversely outwardly from the vehicle center line in a direction opposite the vehicle driving direction towards the longitudinal strut member, and wherein said bearing rotating shaft extends at an obtuse angle to the mean center line of the longitudinal strut member.

5. An arrangement according to claim 2, wherein said bearing rotating shaft is supported in a sleeve of the longitudinal strut member with the interposition of an elastic bushing having differing elasticities in different radial directions of said bearing rotating shaft.

6. An arrangement according to claim 5, wherein said bearing rotating shaft is connected with the longitudinal strut member by means of a vertically extending pin, said vertical pivot axis extending through said pin.

7. An arrangement according to claim 6, wherein said bearing rotating shaft extends inclined transversely outwardly from the vehicle center line in a direction opposite the vehicle driving direction towards the longitudinal strut member, and wherein said bearing rotating shaft extends at an obtuse angle to the mean center line of the longitudinal strut member.

8. An arrangement according to claim 6, wherein said elastic bushing is provided with recesses at the horizontal sides thereof so as to be more yielding in the horizontal direction of loading than in the vertical direction of loading, said loading being caused by relative movement of said longitudinal strut member and bearing rotating shaft due to forces acting on the vehicle wheel and wheel carrier during vehicle driving.

9. An arrangement according to claim 5, wherein the elastic bushing is constructed to be more yielding in the horizontal direction of loading than in the vertical direction of loading, said loading being caused by relative movement of said longitudinal strut member and bearing rotating shaft due to forces acting on the vehicle wheel and wheel carrier during vehicle driving.

10. An arrangement according to claim 5, wherein said elastic bushing is provided with recesses at the horizontal sides thereof so as to be more yielding in the horizontal direction of loading than in the vertical direction of loading, said loading being caused by relative movement of said longitudinal strut member and bearing rotating shaft due to forces acting on the vehicle wheel and wheel carrier during vehicle driving.

11. An arrangement according to claim 8, wherein said wheel guide linkage is a lower wheel guide linkage for a rear vehicle wheel of a vehicle having similar wheel and wheel suspension at respective opposite sides of the vehicle center line, wherein said rear guide arm is a leaf spring extending substantially transversely of the vehicle from the wheel carrier, and wherein the bearing rotating shaft is connected to the vehicle by means of a front pivot bearing which permits limited pivotal movement of said bearing rotating shaft about a second substantially vertical axis.

12. An arrangement according to claim 2, wherein said wheel guide linkage is a lower wheel guide linkage for a rear vehicle wheel of a vehicle having similar wheel and wheel suspension at respective opposite sides of the vehicle center line, wherein said rear guide arm is a leaf spring extending substantially transversely of the vehicle from the wheel carrier, and wherein the bearing rotating shaft is connected to the vehicle by means of a front pivot bearing which permits limited pivotal movement of said bearing rotating shaft about a second substantially vertical axis.

* * * * *